United States Patent
Sheridan et al.

(10) Patent No.: US 11,168,585 B2
(45) Date of Patent: Nov. 9, 2021

(54) GEARED GAS TURBINE ENGINE WITH IMPROVED BREATHER AIR VENTING

(71) Applicant: United Technologies Corporation, Farmington, CT (US)

(72) Inventors: William G. Sheridan, Southington, CT (US); Kurt Link, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 284 days.

(21) Appl. No.: 15/864,079

(22) Filed: Jan. 8, 2018

(65) Prior Publication Data
US 2019/0211709 A1 Jul. 11, 2019

(51) Int. Cl.
| | | |
|---|---|---|
| *F01D 25/18* | (2006.01) | |
| *F01D 25/24* | (2006.01) | |
| *F02C 7/36* | (2006.01) | |
| *F01D 25/12* | (2006.01) | |
| *F02K 3/06* | (2006.01) | |

(52) U.S. Cl.
CPC ........... *F01D 25/18* (2013.01); *F01D 25/125* (2013.01); *F01D 25/24* (2013.01); *F02C 7/36* (2013.01); *F02K 3/06* (2013.01); *F05D 2240/50* (2013.01); *F05D 2260/4031* (2013.01); *F05D 2260/608* (2013.01); *F05D 2260/609* (2013.01); *F05D 2260/98* (2013.01)

(58) Field of Classification Search
CPC ........ F01D 25/18; F01D 25/125; F01D 25/24; F05D 2260/98; F05D 2240/50; F02K 3/06; F02C 7/36
See application file for complete search history.

(56) References Cited

U.S. PATENT DOCUMENTS

| | | | |
|---|---|---|---|
| 3,382,670 A | 5/1968 | Venable | |
| 8,122,698 B2 * | 2/2012 | Negulescu | ............ B64C 1/1453 60/39.08 |
| 8,572,984 B2 * | 11/2013 | Sheaf | .................... B64C 1/1453 60/39.08 |
| 8,621,839 B2 | 1/2014 | Alecu et al. | |

(Continued)

FOREIGN PATENT DOCUMENTS

GB 2376269 12/2002

OTHER PUBLICATIONS

EP search report for EP19150820.9 dated Sep. 6, 2019.

*Primary Examiner* — David Hamaoui
*Assistant Examiner* — Jesse M Prager
(74) *Attorney, Agent, or Firm* — Getz Balich LLC

(57) ABSTRACT

Aspects of the disclosure are directed to a gas turbine engine, having a fan that rotates about a central longitudinal axis. The gas turbine engine may comprise a nacelle having an outer wall that radially circumscribes the fan. The gas turbine engine may further comprise a fan drive gear system that drives the fan, and a rotating shaft that is coupled to and drives the fan drive gear system. The gas turbine engine may further comprise an air vent line in fluid communication with a bearing compartment to remove air from the bearing compartment and provide the removed air to a deoiler that removes oil droplets from the removed air and provides deoiler filtered air. A vent output line receives the deoiler filtered air and discharges the deoiler filtered air along a radially interior surface of the nacelle outer wall.

4 Claims, 6 Drawing Sheets

(56) References Cited

U.S. PATENT DOCUMENTS

| | | | |
|---|---|---|---|
| 2005/0217272 A1* | 10/2005 | Sheridan | B01D 45/14 60/772 |
| 2010/0293964 A1 | 11/2010 | Sheaf | |
| 2013/0098058 A1 | 4/2013 | Sheridan | |
| 2015/0135660 A1* | 5/2015 | Beier | B01D 45/12 55/404 |
| 2015/0135663 A1* | 5/2015 | Beier | B01D 45/14 55/461 |
| 2016/0177825 A1* | 6/2016 | Burghardt | F01M 11/03 |
| 2017/0130606 A1 | 5/2017 | Niergarth et al. | |
| 2017/0314470 A1* | 11/2017 | Beier | B01D 45/04 |

* cited by examiner

GEARED GAS TURBINE ENGINE WITH IMPROVED BREATHER AIR VENTING

BACKGROUND OF THE INVENTION

1. Technical Field

The present disclosure relates to a gas turbine engine and, more particularly to an oil breather air venting system.

2. Background Information

A geared turbofan engine includes a gear that allows the fan to rotate at a different speed than the low pressure (LP) shaft. This enables the fan to rotate slower while the low pressure compressor and turbine operate at a high speed, increasing engine efficiency and delivering significantly lower fuel consumption, emissions and noise. This increased efficiency also translates to fewer engine stages and parts for lower weight and reduced maintenance costs.

Since the gear requires more oil than a non-geared turbofan engine, the management of the oil becomes more important, and legacy oil breather systems may not be suitable for a geared turbofan engine.

Prior art oil breather systems include various venting configurations. For example, U.S. Pat. No. 8,572,984 discloses venting to the outer diameter of the nacelle (i.e., outside the fan stream). U.S. Pat. No. 8,621,839 vents to the mid fan stream. U.S. Patent Application Publication 2017/0130606 discloses nose cone venting. There is a need for an oil breather venting system for a geared turbofan engine that separates the vented stream from hot gases discharged by the engine to mitigate the risk of an oil fire.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a gas turbine engine, having a fan that rotates about a central longitudinal axis. The gas turbine engine may comprise a nacelle having an outer wall that radially circumscribes the fan. The gas turbine engine may further comprise a fan drive gear system that drives the fan, and a rotating shaft that is coupled to and drives the fan drive gear system. The gas turbine engine may further comprise an air vent line in fluid communication with a bearing compartment to remove air from the bearing compartment and provide the removed air to a deoiler that removes oil droplets from the removed air and provides deoiler filtered air. A vent output line receives the deoiler filtered air and discharges the deoiler filtered air along a radially interior surface of the nacelle outer wall.

The gas turbine engine further comprising an accessory gear box where the deoiler is located adjacent to the accessory gear box.

The deoiler may be located adjacent to the fan drive gear system.

The vent line may pass through a strut extending between a fan case and a nacelle outer wall.

The vent output line may include a vent line exit that is flush with the interior surface of the nacelle outer wall and through which the deoiler filtered air is discharged.

The vent output line may include a plurality of line exits that are flush with the interior surface of the nacelle outer wall and through which the deoiler filtered air is discharged.

The vent line exit may discharge the deoiler filtered air perpendicular to fan air flowing adjacent to the nacelle outer wall.

The vent line exit may discharge the deoiler filtered air at an acute angle with respect to fan air flowing adjacent to the nacelle outer wall.

Fan air static air pressure adjacent to the nacelle outer wall may be less than bearing compartment static air pressure such that deoiler filtered air exiting the vent line remains radially proximate to the nacelle outer wall as it mixes with fan air.

According to another aspect of the present disclosure, a gas turbine engine is provided. The gas turbine engine may comprise a fan that rotates about a central longitudinal axis. The gas turbine engine may further comprise a nacelle having a fan cowl that radially circumscribes the fan. The gas turbine engine may further comprise a fan drive gear system that drives the fan, and a rotating shaft may be coupled to and drive the fan drive gear system. The gas turbine engine may further comprise an air vent line in fluid communication with a bearing compartment to remove air from the bearing compartment and provide the removed air to a deoiler that removes oil droplets from the removed air and provides deoiler filtered air. A vent output line may receive the deoiler filtered air and route and discharge the deoiler filtered air adjacent to an interior surface of the fan cowl.

Fan air static air pressure adjacent to the nacelle outer wall may be less than bearing compartment static air pressure such that deoiler filtered air exiting the vent output line remains radially proximate to the nacelle outer wall as it mixes with kinetic fan air.

The vent output line may include a vent line exit that discharges the deoiler filtered air perpendicular to the fan air flowing adjacent to the nacelle outer wall.

The vent output line may include a vent line exit that discharges the deoiler filtered air at an acute angle with respect to fan air flowing adjacent to the nacelle outer wall.

The gas turbine engine may further comprise an accessory gear box where the deoiler is located adjacent to the accessory gear box.

The gas turbine engine may further comprise an accessory gear box where the deoiler is located within a housing of the accessory gear box.

The vent output line may include a vent line exit that is flush with the interior surface of the nacelle outer wall and through which the deoiler filtered air is discharged.

According to another aspect of the present disclosure, a gas turbine engine is provided. The gas turbine engine may comprise a fan that rotates about a central longitudinal axis. The gas turbine engine may further comprise a nacelle having an outer wall that radially circumscribes the fan, and a rotating shaft drives the fan. The gas turbine engine may further comprise an air vent line in fluid communication with a bearing compartment to remove air from the bearing compartment located radially adjacent to the rotating shaft, and provide the removed air to a deoiler that removes oil droplets from the removed air and provides deoiler filtered air. A vent output line receives the deoiler filtered air and discharges the deoiler filtered air along a radially interior surface of the nacelle outer wall, where a proximate end of the vent output line is in fluid communication with the bearing compartment and a distal end of the vent output line is in fluid communication with fan air passing along the nacelle outer wall such that the static air pressure at the distal end is less than the proximate end.

Fan air static air pressure adjacent to the nacelle outer wall may be less than bearing compartment static air pressure such that deoiler filtered air exiting the vent output line remains radially proximate to the nacelle outer wall as it mixes with fan air.

The vent output line may include a vent line exit that discharges the deoiler filtered air perpendicular to the fan air flowing adjacent to the nacelle outer wall.

The vent output line may include a vent line exit that discharges the deoiler filtered air at an acute angle with respect to fan air flowing adjacent to the nacelle outer wall.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
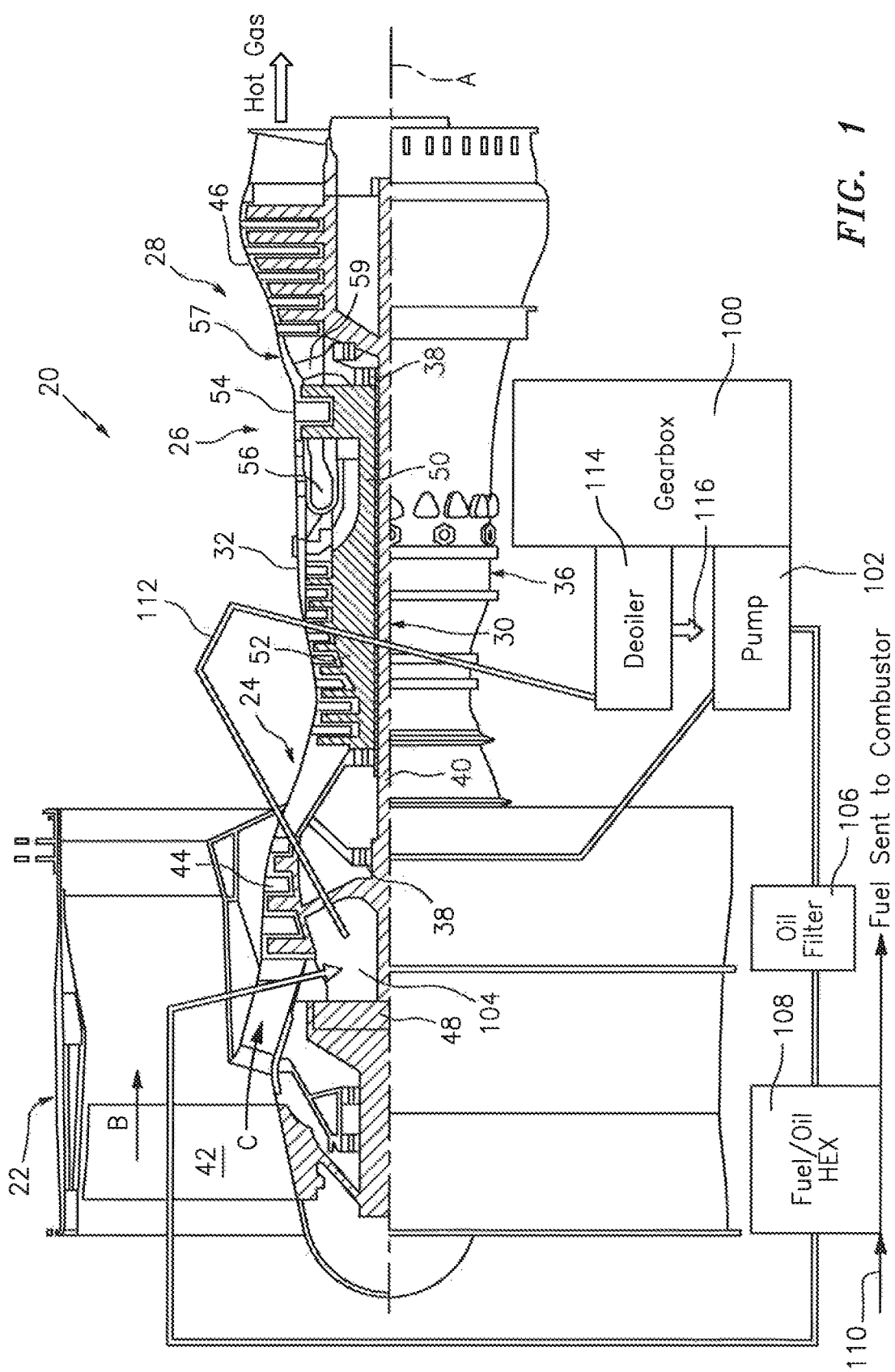
FIG. 1 schematically illustrates a geared turbofan engine comprising a deoiler that is vented to the fan stream.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a fan case 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

The engine may also include an accessory gearbox 100 that drives an oil pump 102. The pump 102 removes oil from a bearing compartment 104 and routes the removed oil to a filter 106. The filtered oil is then input to a heat exchanger 108 to cool the oil before sending it back into the bearing compartment 104 to lubricate bearings and the FDGS 48. The heat exchanger 108 uses fuel 110 to cool the oil and conversely warm the fuel prior to combustion. Air leaks into the bearing compartment 104 from the engine gas path through seals.

The air is removed from the bearing compartment 104 through a breather tube 112 that is connected to a deoiler 114, which removes oil droplets from the airstream received via the breather tube 112. The deoiler 114 provides decontaminated air (e.g., no oil mist) via vent line 116 that is routed to the cool air in the fan stream. This configuration ensures that a leak in the heat exchanger 108 does not result in a fire event.

The deoiler 114 may be located inside the gearbox 100, or exterior thereto. In addition, the deoiler 114 may be located inside of or exterior to the gear system 48.

The vent line 116 from the deoiler is routed to the outer diameter (OD) of the fan air stream, which is radially separated from the hot gas exiting the engine.

Figure 2:
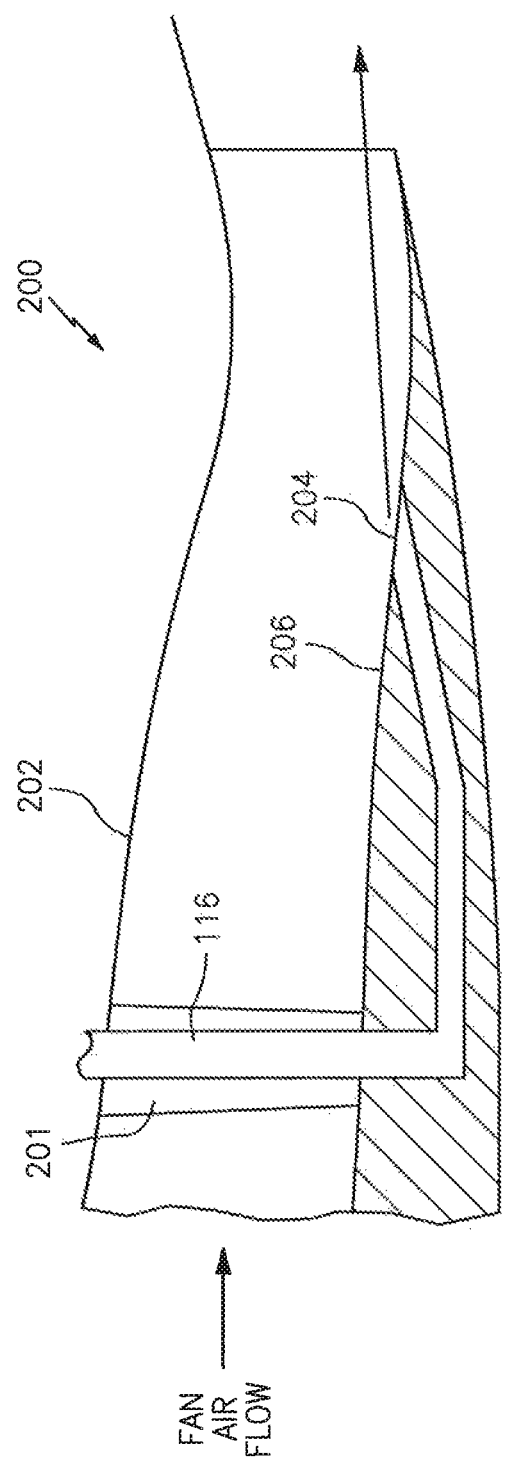
FIG. 2 schematically illustrates a portion of the nacelle that includes a vent line.

FIG. 2 schematically illustrates a portion of a nacelle 200 for the gas turbine engine 20 (FIG. 1). The vent line 116 from the deoiler 114 (FIG. 1) may pass through a strut 201 extending between the engine (e.g., fan case) and the nacelle 200, and into an outer wall 206 of the nacelle. The deoiled air mixture exits the vent line 116 at vent line exit 204 located in the outer wall 206 and mixes with the fan air flow 205 from the fan. The static air pressure at the vent line exit 204 is lower than the static air pressure in the bearing compartment 104 because of the velocity of the fan air passing along the outer wall 206. As a result the deoiled air and any associated liquid mist exiting from the vent line exit 204 remains adjacent to the outer wall 206 of the nacelle 200, and thus removed from the hot exhaust gases radially closer to the axial center line A of the engine.

Figure 3:
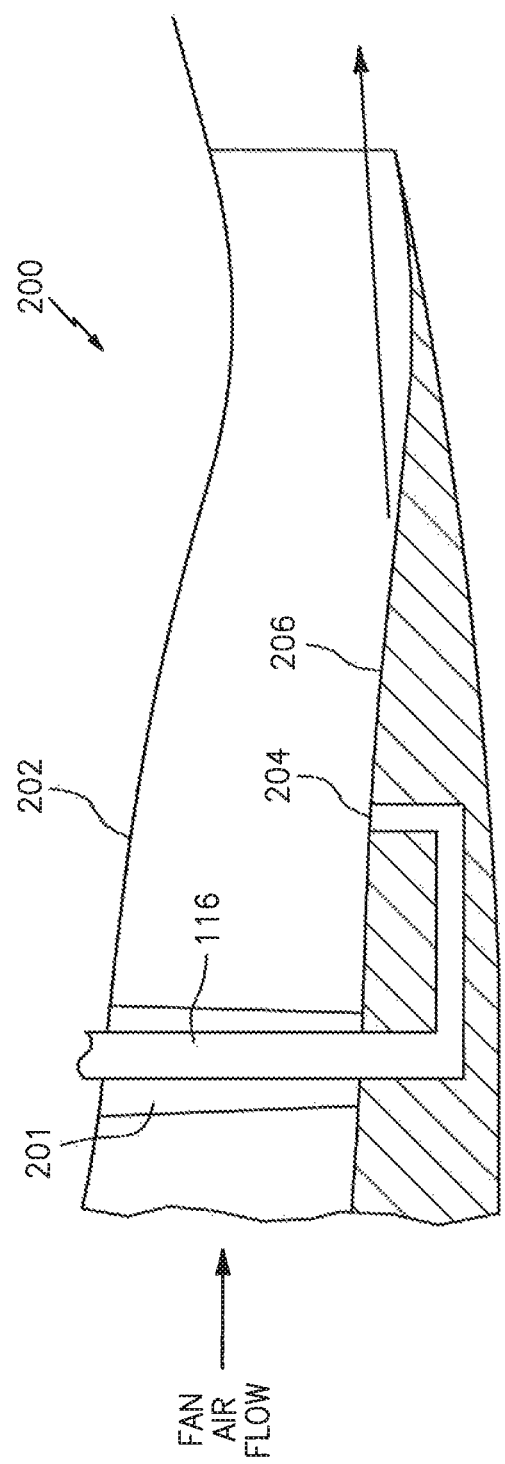
FIG. 3 schematically illustrates an alternative embodiment of a portion of the nacelle that includes a vent line.
Figure 4:
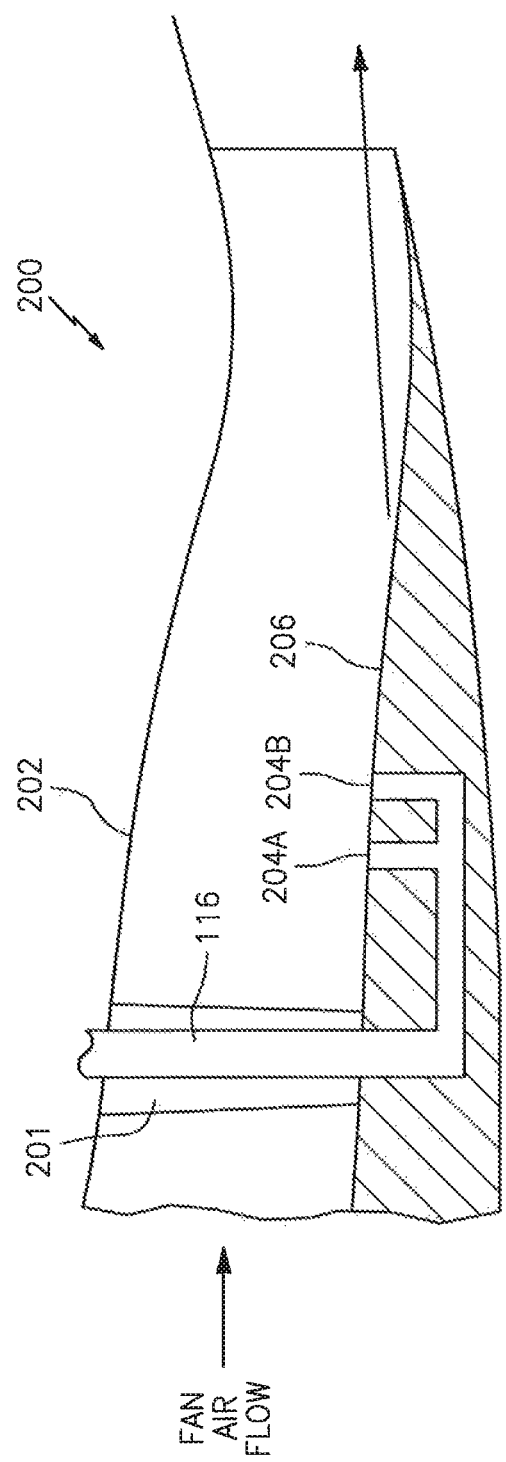
FIG. 4 schematically illustrates another alternative embodiment of a portion of the nacelle that includes a vent line.
Figure 5:
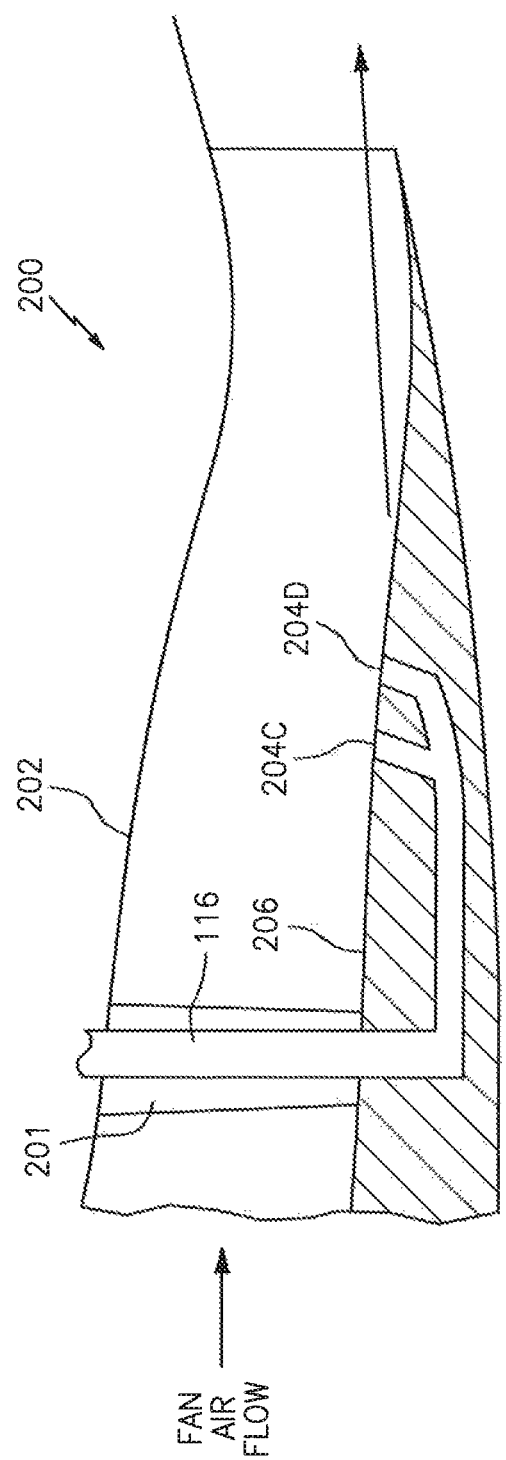
FIG. 5 schematically illustrates yet another alternative embodiment of a portion of the nacelle that includes a vent line.
Figure 6:
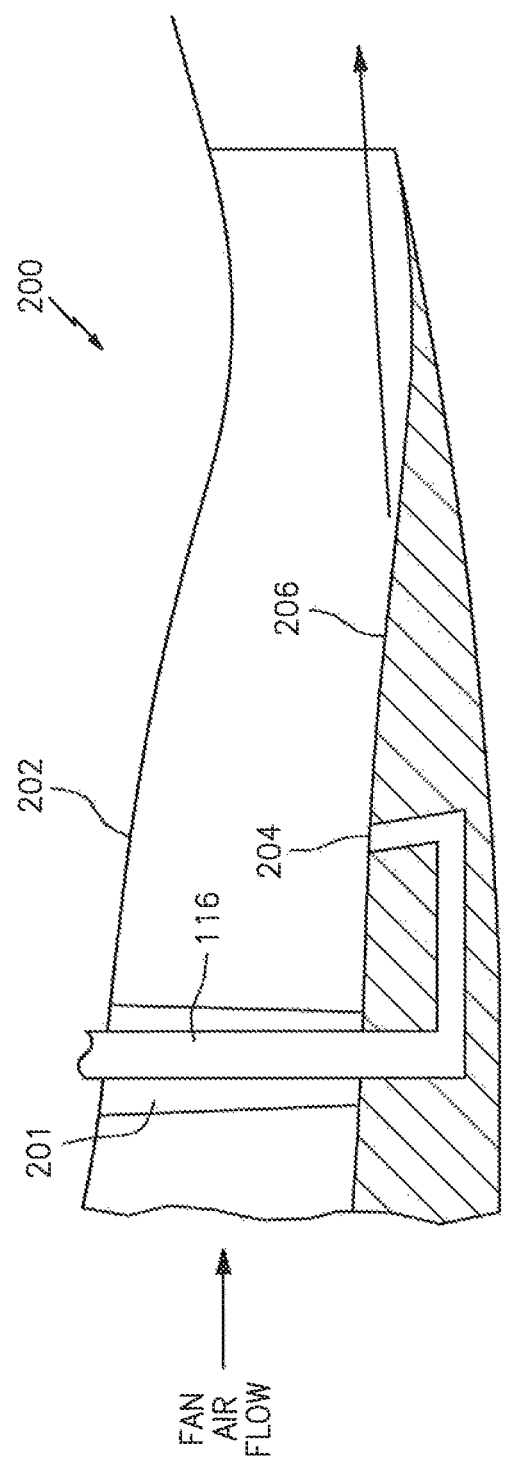
FIG. 6 schematically illustrates still another alternative embodiment of a portion of the nacelle that includes a vent line.

The vent line 116 may include one or more exits that discharge the low pressure deoiled air mixture along the outer wall 206. For example, the deoiled air mixture may exit from the vent line exit 204 at an acute angle with respect to the path of the fan air flow 205. In an alternative embodiment illustrated in FIG. 3 the deoiled air mixture may exit from the vent line exit 204 perpendicular with respect to the fan air flow path. Similarly, in another alternative embodiment illustrated in FIG. 4 the deoiled air mixture may exit from a plurality of vent line exits 204A, 204B perpendicular with respect to the fan air flow path. FIG. 5 illustrates an embodiment where deoiled air mixture may exit from a plurality of vent line exits 204C, 204D at an angle (e.g., acute) with respect to the fan air flow path. FIG. 6 illustrates an embodiment where the deoiled air mixture may exit from the vent line 204 at a reverse angle with respect to the fan air flow path. In each embodiment since the fan air static air pressure adjacent to the nacelle outer wall is less than the bearing compartment static air pressure, the deoiled filtered air exiting the vent line remains radially proximate to the nacelle outer wall as it mixes with fan air and is discharged from the engine.

It is contemplated that the vent line exit may include one or more exits that discharge the deoiled mixture, and may include various discharge angles with respect to the fan air flow path.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine, comprising:
a fan that rotates about a central longitudinal axis;
a nacelle having an outer wall that radially circumscribes the fan;
a fan drive gear system that drives the fan;
a rotating shaft that is coupled to and drives the fan drive gear system;
an air vent line in fluid communication with a bearing compartment to remove air from the bearing compartment and provide the removed air to a deoiler that removes oil droplets from the removed air and provides deoiler filtered air; and
a vent output line that receives the deoiler filtered air and discharges the deoiler filtered air along a radially interior surface of the nacelle outer wall,
where fan air static air pressure adjacent to the nacelle outer wall is less than bearing compartment static air pressure such that deoiler filtered air exiting the vent output line remains radially proximate to the nacelle outer wall as it mixes with fan air,
where the vent output line includes a vent line exit that is flush with the interior surface of the nacelle outer wall and through which the deoiler filtered air is discharged,
where the vent output line exit discharges the deoiler filtered air at an acute angle with respect to fan air flowing adjacent to the nacelle outer wall.

2. The gas turbine engine of claim 1, further comprising an accessory gear box where the deoiler is located adjacent to the accessory gear box.

3. The gas turbine engine of claim 1, where the vent output line passes through a strut extending between a fan case and a nacelle outer wall.

4. The gas turbine engine of claim 1, where the vent output line includes a plurality of line exits that are flush with the interior surface of the nacelle outer wall and through which the deoiler filtered air is discharged.

* * * * *